Figure 1:
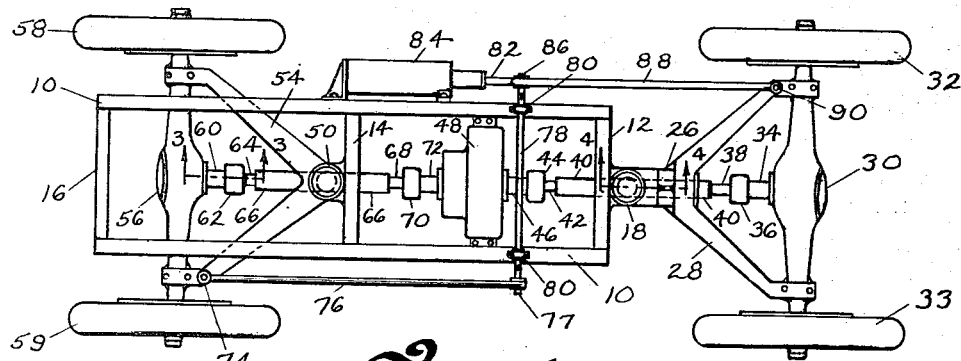

July 13, 1954  
G. J. PROST  
2,683,496  
AUTOMOTIVE VEHICLE

Filed April 14, 1949

2 Sheets-Sheet 1

INVENTOR
BY Gilmore J. Prost
ATTORNEY

July 13, 1954  G. J. PROST  2,683,496
AUTOMOTIVE VEHICLE
Filed April 14, 1949  2 Sheets-Sheet 2
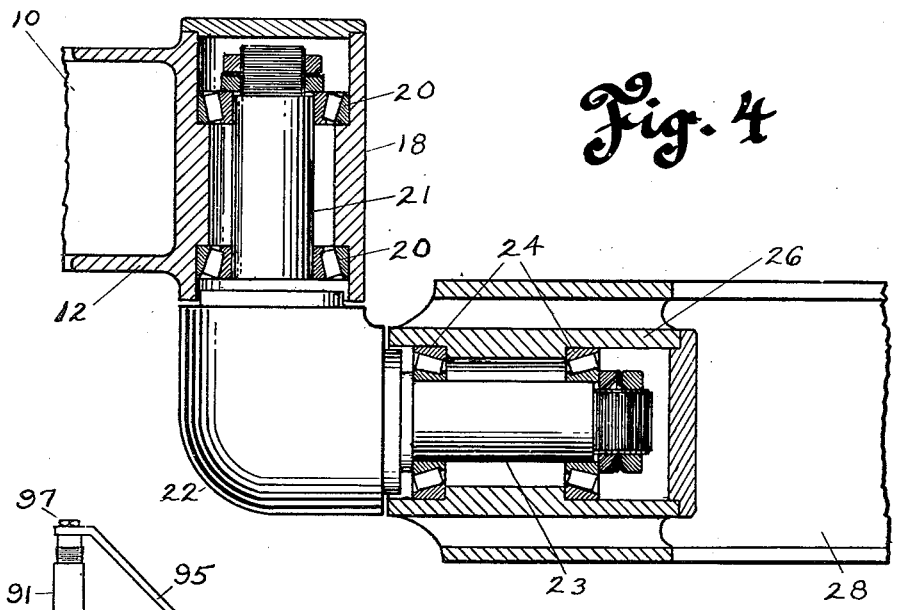
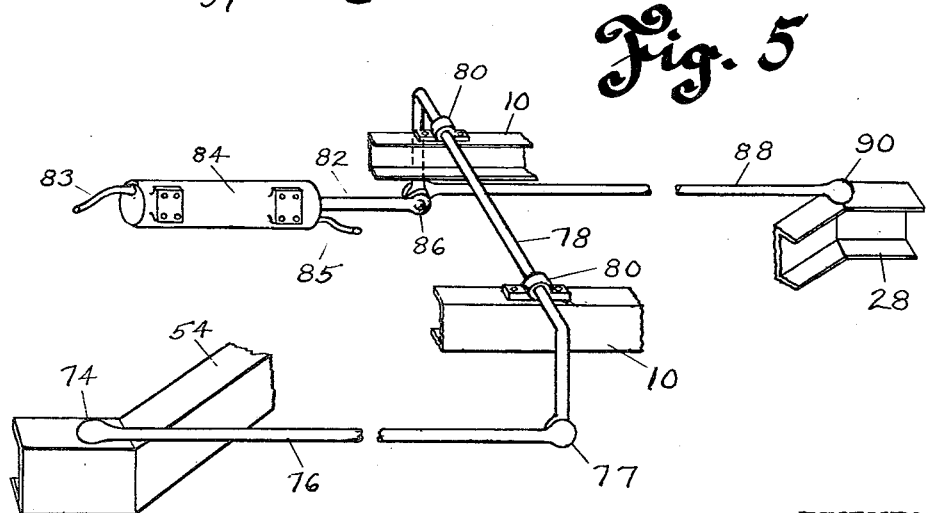
INVENTOR
Gilmore J. Prost
BY
T. Ray Eilers
ATTORNEY Patented July 13, 1954

2,683,496

UNITED STATES PATENT OFFICE 2,683,496

AUTOMOTIVE VEHICLE

Gilmore J. Prost, Perryville, Mo.

Application April 14, 1949, Serial No. 87,435

3 Claims. (Cl. 180—50)

This invention relates to improvements in automotive vehicles. More particularly, this invention relates to an improved four-wheel drive for automotive vehicles.

It is therefore an object of the present invention to provide an improved four-wheel drive for automotive vehicles.

It is desirable to apply power to all of the four wheels of automotive vehicles, particularly where the vehicles are to be operated over rough terrain or on slippery surfaces. The application of power to all of the wheels of the vehicles distributes the driving forces among those wheels, thus increasing the overall force which those wheels can apply and also increasing the effective tractive areas between the vehicles and the ground. The increase in the overall force and the increased tractive areas, made possible with four-wheel drive, enable the vehicles to climb steeper slopes, move heavier loads, and minimize skidding.

Various four-wheel drives have been proposed and used; and one of those drives has a clutch between the engine and the two wheels at the left side of the vehicle, and has a second clutch between the engine and the two wheels at the right side of the vehicle. The clutches enable the wheels at one side of the vehicle to be driven forwardly while the wheels at the other side of the vehicle are braked or are driven rearwardly; and this facilitates steering of the vehicle. Such a drive is practicable; but it causes excessive wear of the tires when the vehicle is steered, and it makes steering of the vehicle difficult. Another four-wheel drive has drive shafts extending forwardly and rearwardly from a gear housing at the center of the vehicle, and those shafts are connected to differential and axle housings. The drive shafts transmit power from the gear housing to the gears in the differential and axle housing, and those gears and the axles connected thereto transmit the power to the wheels. One or more of the differential and axle housings is mounted for rotation about a vertical axis, and rotation of that differential and axle housing about that axis will facilitate steering of the vehicle. Universal joints are provided between the gear housing and the rotatable differential and axle housing; and the universal joints permit transmission of power to the differential and axle housing while permitting rotation of that housing. However, the rotation of the differential and axle housing, required for steering of the vehicle, causes sharp bending of the universal joints; and that bending causes excessive friction and excessive wear in those joints. Still another four-wheel drive has fixed differential and axle housings at the front and rear of the vehicle and has universal joints adjacent the wheels. The universal joints transmit power to the wheels from the differential gears, and yet they permit the wheels to be moved to steer the vehicle. However, the bending of the universal joints, consequent upon the steering of the vehicle, is excessive; and that bending causes excessive friction and excessive wear in the universal joints. For these various reasons, prior four-wheel drives for automotive vehicles are objectionable. The present invention obviates these objections by providing a drive shaft which extends from a gear housing to a rotatable differential and axle housing and which has universal joints disposed on opposite sides of the pivot for the universal and axle housing. Such an arrangement greatly reduces the bending of the universal joints in the drive shaft; and that reduction causes a reduction in the friction and the wear in those universal joints. It is therefore an object of the present invention to provide a drive shaft which extends from the gear housing to the differential and axle housing of an automotive vehicle and which has universal joints disposed on opposite sides of the pivot for that universal and axle housing.

In some instances where the four-wheel drive employs universal joints adjacent the steerable wheels, the friction and wear in those universal joints are so excessive that a clutch must be provided to disconnect the steerable wheels from the engine. Such a clutch enables the steerable wheels to run free most of the time and to be driven only when four-wheel drive is required. While such an arrangement minimizes friction and wear in the universal joints, by permitting the steerable wheels to run free, it is unable to provide continuous four-wheel drive and it requires an additional clutch. The present invention obviates the need of an additional clutch, and yet minimizes friction and wear in the universal joints while providing continuous four-wheel drive.

The steerable wheels of the vehicle provided by the present invention are mounted on a frame that pivots relative to the chassis of the vehicle. This frame carries and supports a differential and axle housing; and that housing will be spaced longitudinally from the pivot for the frame. As a result, when the frame is rotated to permit steering of the automotive vehicle, that frame will move the inner wheel toward the other end of the vehicle and thereby reduce the turning radius of the vehicle below the turning radius of vehicles which have the same wheel base but which have the wheels thereof held against longitudinal movement relative to the chassis. The exact distance which the inner wheel will move toward the other end of the automotive vehicle will be determined by the distance between the pivot of the frame and the wheels carried by that frame, by the transverse distance between those wheels, and by the angle through which the frame is rotated; but in each and every instance that distance will be finite and will reduce the turning radius of the vehicle.

Where the vehicle is provided with rotatable frames at the front and rear thereof, the vehicle can have a very short radius of turn because both inner wheels will move toward the opposite end of the vehicle and act to reduce the turning radius of the vehicle. With such an arrangement the vehicle can be made extremely maneuverable, a feature that is eminently desirable in automotive vehicles.

In some instances the terrain over which automotive vehicles are to be operated is so rough that all of the wheels of ordinary wheels cannot remain on the ground at all times. Where one of the driving wheels of an automotive vehicle is forced out of contact with the ground by the inclination or the changes in surface of the terrain, that wheel is momentarily unable to apply driving forces to the ground; and where that wheel is driven by differential gears, the other wheel driven by those gears will also be unable to apply driving forces to the ground. This is very objectionable since it prevents full application of driving force to the ground at all times. The present invention obviates this objection by mounting a wheel-supporting frame, of the automotive vehicle, so it can rotate about a horizontal as well as a vertical axis. The rotation of that frame about the horizontal axis will enable all of the wheels of the vehicle to engage the ground at all times. It is therefore an object of the present invention to mount a wheel-supporting frame of an automotive vehicle so it can rotate about a horizontal and a vertical axis.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purposes of illustration only and do not limit the invention and that the invention will be defined by the appended claims.

Figure 2:
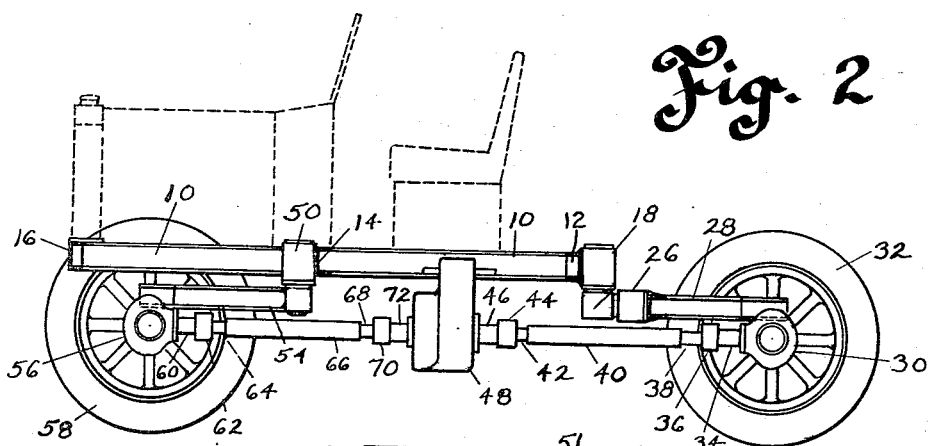
Figure 3:
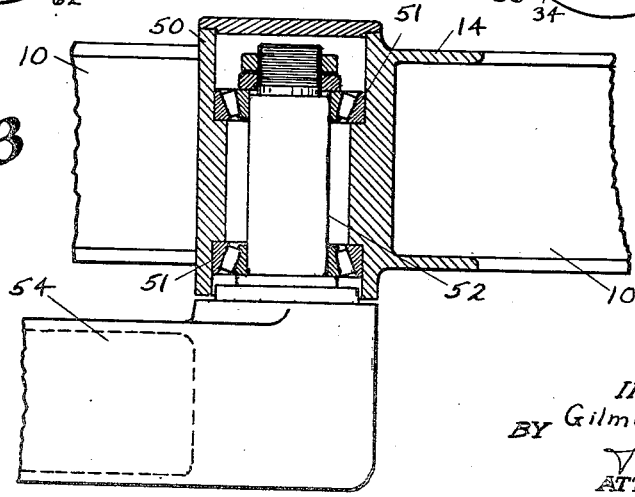

In the drawing Fig. 1 is a plan view of a chassis, for an automotive vehicle, that has incorporated in it the principles and teachings of the present invention, Fig. 2 is a partially-sectioned side elevational view of the chassis shown in Fig. 1, Fig. 3 is an enlarged, partially-sectioned side elevational view of a portion of the chassis shown in Figs. 1 and 2, Fig. 4 is an enlarged, partially-sectioned side elevational view of another portion of the chassis shown in Figs. 1 and 2, Fig. 5 is a perspective view of the steering apparatus for the chassis shown in Figs. 1 and 2, and Fig. 6 is a partially sectioned, side elevational view of a modified form of that portion of the chassis which is shown in Figs. 1 and 2.

Referring to the drawing in detail, the numeral 10 denotes longitudinally-extending channels which coact with transversely-extending channels 12, 14, and 16 to form a rigid and sturdy structural frame for the chassis provided by the present invention. The channels 10, 12, 14 and 16 are preferably welded together. A vertically-directed bearing housing 18 is fixedly secured to the cross channel 12, as by welding; and that bearing housing receives two vertically-spaced roller bearings 20. The roller bearings 20 encircle and support the vertically-disposed section 21 of an L-shaped bracket 22, and the horizontally-disposed section 23 of the L-shaped bracket 22 extends into and is encircled by horizontally-spaced roller bearings 24. These spaced roller bearings are supported and held within a bearings housing 26; and that housing is secured to a wheel-supporting frame 28, as by welding.

The wheel-supporting frame 28 has two angularly disposed arms that extend outwardly from the bearing housing 18, and the outer ends of those arms support a differential and axle housing 30. The arms of frame 28 are shown as being directly connected to the housing 30, but it should be noted that those arms could, if desired, be connected to that housing by springs, shock absorbers, or the like. The housing 30 coacts with the arms of the frame 28 to provide a generally triangular configuration for that frame. Wheels 32 and 33 are secured to the ends of the axles, not shown, which project from the differential and axle housing 30, and those wheels will respond to power transmitted to the gears within the differential and axle housing 30 to apply driving forces to the ground.

Power is transmitted to the gears within the differential and axle housing 30 by a stub shaft 34, a universal joint 36, splined section 38 of universal joint 36, a connecting shaft 40, a universal joint 44 an its section 42, a stub shaft 46, and the gears, not shown, within the gear housing 48. The stub shaft 34 extends outwardly from the differential and axle housing 30 to support the universal joint 36. That universal joint has a splined section 38 at the other end thereof, and that section extends into the splined end of the connecting shaft 40. The other end of the connecting shaft 40 receives the section 42 of the universal joint 44 which is supported by stub shaft 46; and that shaft extends into the gear housing 48. This gear box is supported by the channels 10 of the rectangular frame of the chassis, and it will be connected to the engine, not shown, of the automotive vehicle by a clutch, not shown.

A vertically-directed bearing housing 50 is secured to the cross channel 14, as by welding, and that bearing housing encircles and supports vertically-spaced roller bearings 51. The roller bearings 51 encircle and support a pivot 52 which is fixedly secured to and carried by wheel-supporting frame 54. The frame 54 has two angularly disposed arms that extend outwardly from the bearing housing 50, and the outer ends of those arms support a differential and axle housing 56. The arms of frame 54 are shown as being directly secured to the housing 56, but it should be noted that those arms could, if desired, be connected to that housing by springs, shock absorbers, or the like. The housing 56 coacts with the arms of the frame 54 to provide a generally triangular configuration for that frame. Wheels 58 and 59 are secured to the ends of the axles, not shown, which project from the differential and axle housing 56, and those wheels will respond to power transmitted to the gears within the differential and axle housing 56 to apply driving forces to the ground. Power is transmitted to the gears within the differential and axle housing 56 by a stub shaft 60, a universal joint 62, splined section 64 of universal joint 62, connecting shaft 66, a universal joint 70 and its section 68, and a stub shaft 72. The stub shaft 60 extends outwardly from the differential and axle housing 56 to support the universal joint 62. That universal joint has a splined section 64 at the other end thereof, and that section extends into the splined end of the connecting shaft 66. The other end of the connecting shaft 66 receives the section 68 of the universal joint 70 which is supported by the stub shaft 72; and that shaft extends into the gear housing 48.

The engine, to which the gear housing 48 will be connected by a clutch, may be a diesel engine, a gasoline engine or a semi-diesel engine; and it will be suitably secured to the rectangular frame formed from channels 10, 12, 14 and 16. Power from that engine will be selectively transmitted to gear housing 48 by the clutch, which may be operated mechanically, pneumatically, or hydraulically; and the gears within housing 48 will transmit that power to the stub shafts 46 and 72. If desired, stub shafts 46 and 72 can be made as one shaft.

The universal joints 36 and 44, and the universal joints 62 and 70 permit transmission of power from gear housing 48 to the differential and axle housings 30 and 56 while permitting rotation of the wheel-supporting frames 28 and 54. The rotation of the frames 28 and 54 relative to the bearing housings 18 and 50 will cause bending of the universal joints 36 and 44 and of the universal joints 62 and 70. The angles to which the universal joints 36, 44, 62 and 70 will be bent will be only one half of the angle through which the frames 28 and 54 are moved in steering the vehicle because the universal joints 36 and 44 are spaced on opposite sides of the bearing housing 18, and the universal joints 62 and 70 are spaced on opposite sides of the bearing housing 50. This is very desirable because it minimizes friction and wear in those universal joints. With such disposition of the universal joints, the vehicle can be given as small a radius of turn as desired without causing undue friction or wear in the universal joints.

This is a vast improvement over prior four-wheel drives wherein the angles to which the universal joints were bent were quite large. In many instances the angles to which the universal joints were bent were equal to or greater than the angle through which the wheels were rotated in steering. In using those prior four-wheel drives it was necessary to use a large radius of turn for the vehicle or to accept excessive wear and friction in the universal joints.

The bending of the universal joints, when the frames 28 and 54 are rotated, will cause the connecting shafts 40 and 66 to be displaced from the shortest lines between gear housing 48 and the differential and axle housings 30 and 56. This causes the overall lengths of the composite drive shafts, formed by the stub shafts, the connecting shafts, and the universal joints, to be greater when the frames 28 and 54 are turned than when they are straight. The present invention compensates for such changes in the overall lengths of the composite drive shafts by providing the splined sections 38 and 64 of the universal joints 36 and 62. These splined sections will engage the splined ends of connecting shafts 40 and 66, and they will transmit power from those connecting shafts while telescoping relative to those connecting shafts. That telescoping action enables the composite drive shafts to have the required lengths at all times.

When the wheel-supporting frames 28 and 54 are rotated, the inner wheels will move toward each other, and that movement will decrease the radius of turn of the vehicle. This decrease in turning radius would be experienced, although to a lesser extent, even if the frame 54 was held against rotation. The exact amount of the decrease in turning radius will be a function of the length and width of the frames 28 and 54 and of the angle through which those frames are rotated. To illustrate this fact in a simple but precise manner, it may be assumed that the frame 54 is locked against rotation, that the distance between the center of bearing housing 18 and the center of wheel 33 is denoted by the letter R, that the normal length of the wheel base of the vehicle is denoted by the letter W, that the angle normally existing between the longitudinal axis of the vehicle and a line extending from the center of wheel 33 to the center of bearing housing 18 is denoted by the latter A, that in steering the vehicle the frame 28 is turned through an angle denoted by the letter B, that the turning radius of the vehicle is denoted by the letter $t$, and that the turning radius of an ordinary vehicle with the same wheel base is denoted by the letter T. These assumptions permit the writing of the following equation:

$$t = \frac{T \cdot (W - R[\cos A - \cos\{A+B\}])}{W}$$

The expression within the parentheses will always be smaller than W, and thus $t$ will always be shorter than T. Where the frame 54 is not locked against rotation, the decrease in turning radius is even greater.

The frame 28 not only rotates in bearings 20, it also rotates in bearings 24. This enables that frame to rotate simultaneously about a vertical and horizontal axis; thus enabling all of the wheels 32, 33, 58 and 59 to engage the ground at all times.

The wheel-supporting frames 28 and 54 are preferably rotated by a steering mechanism that will cause both frames to follow the same arc. One such mechanism is disclosed in Fig. 5, and that mechanism includes a pneumatically operated cylinder 84 which carries a piston 82. A pin 86 connects the outer end of piston 82 with a U-shaped connecting bar 78, and that pin also connects a tie rod 88 to piston 82 and connecting bar 78. The other end of the tie rod 88 is connected to the wheel-supporting frame 28 by a ball and socket joint 90. The U-shaped bar 78 is pivoted to the channels 10 by bearings 80, and its other end is connected to a tie rod 76 by a ball and socket joint 77. The other end of tie rod 76 is secured to frame 54 by a ball and socket 74. The piston 82 responds to hydraulic pressure, selectively applied through hoses 83 and 85, to move relative to cylinder 84 which is bolted to one of the channels 10. When the piston 82 moves inwardly of the cylinder 84 it rotates the U-shaped bar 78 in a clockwise direction, causing that bar to push on the tie rod 76 while pulling on the tie rod 88. This will rotate the frame 54 in a clockwise direction while rotating the frame 28 in a counter-clockwise direction. When the piston moves outwardly of the cylinder 84, it rotates the U-shaped bar 78 in a counter-clockwise direction, causing that bar to pull tie rod 76 while pushing tie rod 88. This will rotate the frame 54 in a counter-clockwise direction while rotating the frame 28 in a clockwise direction.

The rectangular frame of the vehicle provided by the present invention can be terminated adjacent the bearing housing, as indicated at the right hand side of Figs. 1 and 2; or it can be extended beyond that housing, as indicated at the left hand side of Figs. 1 and 2. That frame can support a number of different types of bodies; being capable of supporting passenger bodies, truck bodies, road-machinery bodies, and agriculture-machinery bodies.

Fig. 6 shows an alternate form of L-shaped bracket. This form of bracket can be used where the chassis, or the loads to be withstood thereby, is unusually heavy. The bracket has a vertically-disposed section 91, a horizontally-disposed section 93, and a removable brace 95. The sections 91 and 93 are longer than the corresponding sections of the bracket 22 of Fig. 4, and the ends of those sections will project out of the bearing housings 18 and 26. The ends of those sections are tapped to receive the bolts 97 which extend through openings in brace 95 and secure that brace to the bracket. The brace 95 will not strike any part of the chassis as the frame 28 rotates and it will strengthen the bracket.

Whereas two preferred embodiments of the present invention have been shown and described in the drawing and accompanying description it should be obvious to those skilled in the art that various changes may be made in the form of the invention without affecting the scope thereof.

What I claim is:

1. A vehicle that comprises a structural frame to carry the engine and transmission of said vehicle, a horizontally-disposed wheel-supporting frame, a set of driving wheels supported by said wheel-supporting frame, a pivot for said wheel-supporting frame, a drive shaft which extends from said transmission to said wheel-supporting frame, said pivot permitting rotation of said wheel-supporting frame relative to said structural frame, each of said wheels of said set of wheels being spaced longitudinally and transversely of said pivot in a substantially horizontal plane, said wheel-supporting frame having a differential housing and outwardly directed tubes supported by said differential housing and having two angularly disposed arms which are secured to said tubes and extend to said pivot, said wheel-supporting frame having said tubes and said differential housing as one side thereof, and said wheel-supporting frame having said angularly disposed arms as the other two sides thereof whereby said wheel-supporting frame is triangular in configuration, a second horizontally disposed wheel-supporting frame, a second set of wheels supported by said second wheel-supporting frame, a second pivot for said second wheel-supporting frame, a second drive shaft which extends from said transmission to said second wheel-supporting frame, said second pivot permitting rotation of said second wheel-supporting frame relative to said structural frame, each of said wheels of said second set of wheels being spaced longitudinally and transversely of said second pivot in a substantially horizontal plane, said second wheel-supporting frame having a differential housing and outwardly directed tubes supported by said differential housing and having two angularly disposed arms which are secured to said tubes and extend to said second pivot, said second wheel-supporting frame having the said tubes and the said differential housing thereof as one side thereof, and said second wheel-supporting frame having the said angularly disposed arms thereof as the other two sides thereof whereby said second wheel-supporting frame is triangular in configuration, said first and second pivots being spaced longitudinally apart along the length of said structural frame, said first and second drive shafts having universal joints therein that extend between said transmission and said differential housings of said wheel-supporting frames to drive said sets of wheels, the universal joints in said shafts being oppositely disposed of said pivots to accommodate the sizeable lateral movement of said differential housings as said wheel-supporting frames rotate about said pivots, said pivots constituting substantially the sole support for said structural frame.

2. A vehicle as claimed in claim 1 wherein the first said pivot is disposed rearwardly of the front end of said structural frame, wherein the first said angularly disposed arms extend forwardly from the first said pivot to dispose the first said differential housing and the first said set of wheels forwardly of the first said pivot, wherein said second pivot is disposed adjacent the rear end of said structural frame, and wherein the second said angularly disposed arms extend rearwardly from said second pivot to dispose the second said differential housing and the second set of wheels rearwardly of said second pivot.

3. A vehicle as claimed in claim 1 wherein said second pivot is L-shaped, wherein one arm of said second pivot is directed upwardly and the other arm of said pivot is directed outwardly, wherein said upwardly directed arm of said pivot rotates relative to said structural frame whereby said second wheel-supporting frame can rotate about a substantially vertical axis, and wherein said second wheel-supporting frame can rotate relative to said outwardly directed arm of said pivot and thereby keep all of the wheels of said vehicle on the ground.

References Cited in the file of this patent

UNITED STATES PATENTS

| Number | Name | Date |
|---|---|---|
| 500,212 | Reynolds | June 27, 1893 |
| 749,165 | Burson et al. | Jan. 12, 1904 |
| 810,261 | Cantelou | Jan. 16, 1906 |
| 1,066,072 | Bouas | July 1, 1913 |
| 1,097,807 | Leonard | May 26, 1914 |
| 1,150,727 | Alexander | Aug. 17, 1915 |
| 1,210,055 | Fairman | Dec. 26, 1916 |
| 1,457,692 | Carter | June 5, 1923 |
| 2,003,718 | McCarthy et al. | June 4, 1935 |
| 2,134,387 | Zimka et al. | Oct. 25, 1938 |
| 2,355,893 | Le Tourneau | Aug. 15, 1944 |
| 2,426,652 | Storey | Sept. 2, 1947 |
| 2,582,142 | Martin | Jan. 8, 1952 |
| 2,595,594 | Martin | May 6, 1952 |